(12) United States Patent
Busby-Robinson

(10) Patent No.: US 11,706,605 B2
(45) Date of Patent: Jul. 18, 2023

(54) 911 APP

(71) Applicant: Patricia Busby-Robinson, Greenwood, MS (US)

(72) Inventor: Patricia Busby-Robinson, Greenwood, MS (US)

( * ) Notice: Subject to any disclaimer, the term of this patent is extended or adjusted under 35 U.S.C. 154(b) by 122 days.

(21) Appl. No.: 17/529,109

(22) Filed: Nov. 17, 2021

(65) Prior Publication Data

US 2023/0156446 A1 May 18, 2023

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ................................. H04W 4/90; H04W 4/029
See application file for complete search history.

(56) References Cited

U.S. PATENT DOCUMENTS

| | | | | |
|---|---|---|---|---|
| 8,571,185 B1* | 10/2013 | Loizeaux | .......... | H04M 1/72424 370/352 |
| 2005/0169439 A1* | 8/2005 | Binning | .............. | H04L 12/2854 379/45 |
| 2010/0117869 A1* | 5/2010 | Rieth | ..................... | G08G 1/205 455/404.2 |
| 2010/0317317 A1* | 12/2010 | Maier | ................... | H04W 4/029 455/404.2 |

\* cited by examiner

*Primary Examiner* — Marcos L Torres
(74) *Attorney, Agent, or Firm* — David J. Kreher

(57) ABSTRACT

A system for identifying local emergency response resources and sending emergency response to the location of a third party communication device by identifying the location of a third party communication device based on the device's geospatial placement, street address associated with the communication device, user designated address, or IP address, and from the location, using a National Emergency Telephone Number System (NETNS) to identify an emergency dispatch office location nearest to and that serves the area where the third party communication device is located, communicating the location of the third party communication device to the local dispatch office, and communicating with that emergency dispatch office the nature of the emergency so that the user of the third party communication device can get assistance.

16 Claims, 2 Drawing Sheets

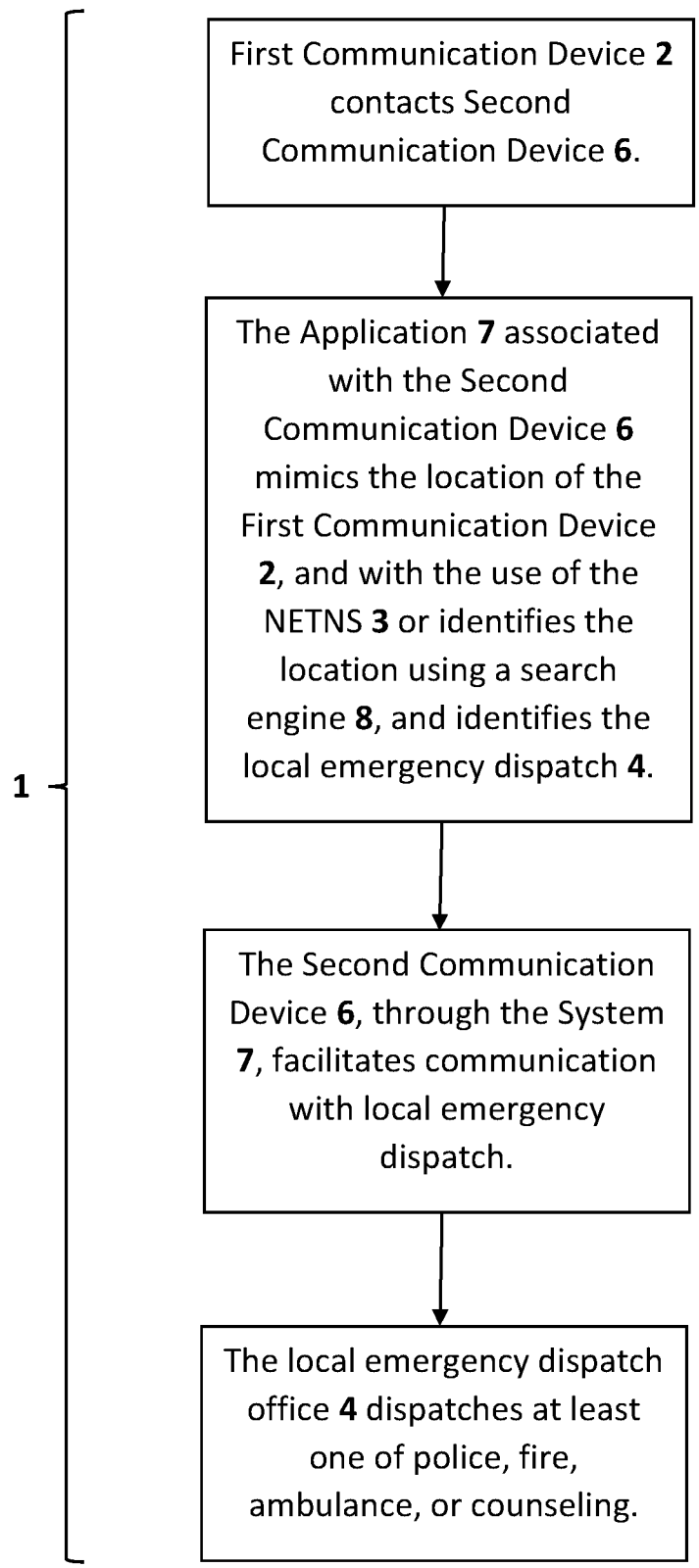

911 APP

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

The present disclosure reveals a system and application that works with a communication device and a communication device of a third party to identify the location of the third party, identify the emergency response office in the area of the third party, and communicate with emergency response in the location of the third party so that the third party can receive needed aid.

Background of the Invention

Entities such as counselors, psychologists, psychiatrists, hospitals, mental health agencies, addiction treatment centers, suicide prevention hotlines, and many others receive communications from individuals who are in need of emergency response assistance. The location of the individual in need may or may not be known, and may or may not be local to the organization. Thus, there is a need for the listed entities as well as others to be able to know the emergency response resources and have emergency response assistance provided to the individuals who call, even when the callers are located in another geographic region or will not disclose their location.

SUMMARY OF THE INVENTION

The present disclosure reveals a system for knowing the emergency response resources and providing emergency response to a third party not at the location of the emergency response caller. The system comprises a first communication device, a second communication device, a plurality of emergency dispatch offices, the NETNS, at least one internet search engine, and an application. The application works in conjunction with a communication device so that when the user of the communication device determines that the third party with whom the user of the communication device is communicating determines that the third party is in distress, the user of the communication device can notify the emergency dispatch office and other emergency resources in the area of the third party so that a local entity can properly respond. The ability to obtain the location to the local emergency dispatch office and other emergency resources is the result of the application mimicking the location of the third party's communication device with the NETNS and when conducting the internet search.

The application may allow a user of the second device to communicate with an operator of the emergency dispatch office or other emergency resources in the area of the first communication device without the user of the first communication device knowing.

The application may allow the operator at the emergency dispatch office or other emergency resources in the area of the second communication device to receive the communications between the user of the first communication device and the user of the second communication device.

The application may also allow the operator at the emergency dispatch office or other emergency resources in the area of the first communication device to communicate with the user of the first communication device as well as the user of the second communication device.

The application 7 may further comprise at least one of the functions of allowing the input and storage of client intake information, allowing the input and storage of client emergency contact information, calendaring, note taking, client calling, video conferencing, recordation of communications, or tracking the day, date, and length of time of a session.

BRIEF DESCRIPTION OF THE SEVERAL VIEWS OF THE DRAWING

FIG. 2 displays a one-line drawing of the application allowing a user to identify and mimic the location of a third party so that the location of the third party can be reported to the local emergency dispatch operator so that the third party can receive assistance.

DETAILED DESCRIPTION OF THE INVENTION

Figure 1:
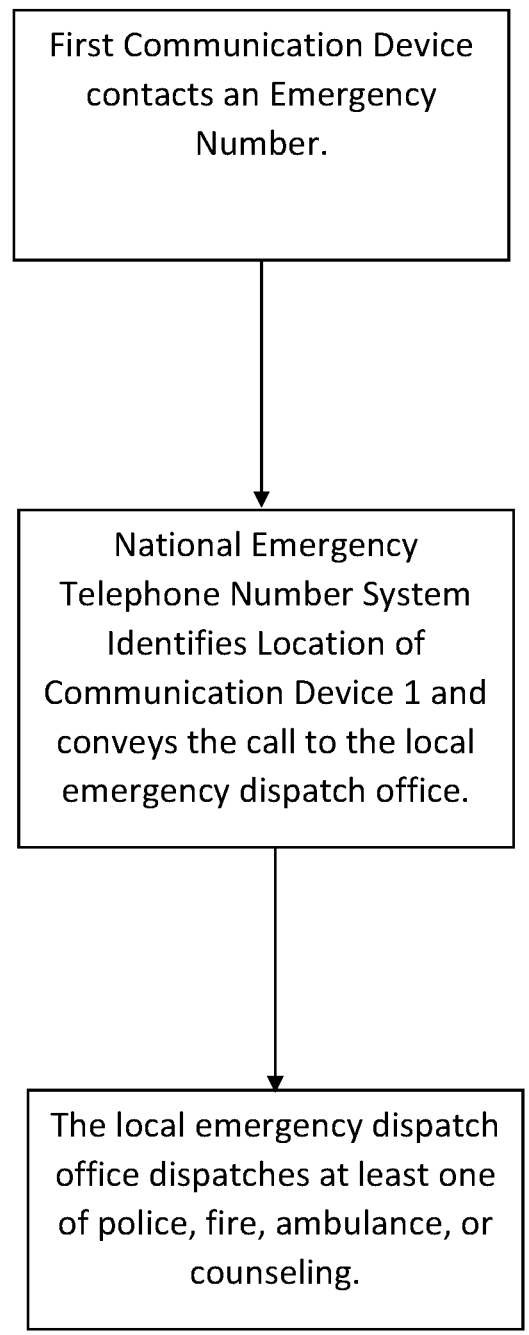
FIG. 1 displays a one-line drawing of the traditional emergency response system including caller, the National Emergency Telephone Number System, and the local emergency dispatch office as distinguished from a plurality of emergency dispatch offices in the region.

The present disclosure reveals a system 1 for knowing the emergency response resources and sending emergency response to the location of a third party communication device 2 by identifying the location of a third party communication device 2, from the location, using a National Emergency Telephone Number System (NETNS) 3 to identify an emergency dispatch office 4 location nearest to and that serves the area where the third party communication device 2 is located, communicating the location of the third party communication device 2 to the local emergency dispatch office 4, and communicating with that emergency dispatch office 4 the nature of the emergency so that the user of the third party communication device 2 can get assistance. The system comprises a first communication device 5, a second communication device 6, a plurality of emergency dispatch offices 4, the NETNS 3, at least one internet search engine 8, and an application 7.

The first communication device 2, 5 can communicate through the reception or transmission of at least one of email, text, phone, or video conference, and which has a location that can be identified through at least one of geospatial placement, street address associated with the communication device, user designated address, or IP address.

The second communication device 6 can communicate through the reception and transmission of at least one of email, text, phone, or video conference such that it is in communication with the first communication device 5.

The plurality of emergency dispatch offices 4 are offices that are contacted in the event of an emergency where at least one of police, fire, ambulance, or counseling service is required, which then dispatches the appropriate at least one of police, fire, ambulance, or counseling service to a location in the area of an individual emergency dispatch office.

The NETNS 3 is a single point of communication for emergency response, said communication method being at least one email, text, phone, or video conference, that covers a geographic region, connects with the plurality of emergency dispatch offices within that geographic region, that is contacted in the event of an emergency from a communication device, when at least one of police, fire, ambulance, or counseling is required, that when contacted identifies the location of the communication device based on at least one of the communication device's geospatial placement, street address associated with the communication device, user designated address, or IP address, which can then, based on the location of the communication device, route the contact to an emergency dispatch office that covers the area of the location of the communication device so that at least one of police, fire, ambulance, or counseling is dispatched in response to the contact.

The at least one internet search engine 8 is used in conjunction with the location of the first communication device 5 to identify local emergency response resources such as but not limited to hospitals, police stations, hotlines, treatment centers, and emergency clinics.

The application 7 is connected to the second communication device 6 so that when the first communication device 5 is in contact with the second communication device 6, the application 7 identifies the location of the first communication device 5 based on the first communication device's 5 geospatial placement, street address associated with the communication device, user designated address, or IP address, and the application 7 can then mimic the location of the first communication device's 5 location in order to contact the NETNS 3 to have at least one of police, fire, ambulance, or counseling dispatched to the location of the first communication device 5 from the local emergency dispatch office 4.

The application 7 may allow the user of the second device to communicate 6 with an operator of the emergency dispatch office 4 in the area of the first communication device 2, 5 without the user of the first communication device 5 knowing.

The application 7 may allow the operator at the emergency dispatch office 4 in the area of the first communication device 5 to receive the communications between the user of the first communication device 5 and the user of the second communication device 6.

The application 7 may also allow the operator at the emergency dispatch office in the area of the first communication 5 device to communicate with the user of the first communication device 5 as well as the user of the second communication device 6.

The Application 7 may further mute and unmute communications between the first communication device 5, the second communication device 6, and the local emergency dispatch office.

The application 7 may further comprise at least one of the functions of allowing the input and storage of client intake information, allowing the input and storage of client emergency contact information, calendaring, note taking, client calling, video conferencing, recordation of communications, or tracking the day, date, and length of time of a session.

What is claimed:

1. A system for knowing the emergency response resources and sending emergency response to the location of a third party communication device by identifying the location of a communication device, from the location, using an internet search engine to identify emergency resources in the location of the third party communication device, using an National Emergency Telephone Number System ("NETNS") to identify an emergency dispatch office location is nearest to and serves an area where a communication device is located, communicating the location of the communication device to the local dispatch office, and communicating with that emergency dispatch office the nature of the emergency so that the user of the communication device can get assistance, said system comprising:

a first communication device, a second communication device, a plurality of emergency dispatch offices, a NETNS, at least one internet search engine, and an application;

the first communication device that can communicate through the reception or transmission of at least one of email, text, phone, or video conference, and which has a location that can be identified through at least one of geospatial placement, street address associated with the first communication device, or IP address;

the second communication device that can that can communicate through the reception and transmission of at least one of email, text, phone, or video conference such that it is in communication with the first communication device;

the plurality of emergency dispatch offices are offices that are contacted in the event of an emergency where at least one of police, fire, ambulance, or counseling service is required, which then dispatches the appropriate at last one of police, fire, ambulance, or counseling service to a location in the area of an individual emergency dispatch office;

the NETNS being a single point of communication, said communication method being at least one email, text, phone, or video conference, that covers a geographic region, connects with the plurality of emergency dispatch offices within that geographic region, that is contacted in the event of an emergency from a communication device, when at least one of police, fire, ambulance, or counseling is required, that when contacted identifies the location of the communication device based on at least one of the communication device's geospatial placement, street address associated with the first communication device, or IP address, which can then, based on the location of the communication device, route the contact to an emergency dispatch office that covers the area of the location of the communication device; so that at least one of police, fire, ambulance, or counseling is dispatched in response to the contact;

the at least one internet search engine used in conjunction with the location of the first communication device provides local emergency response resources;

the application is connected to the second communication device so that when the first communication device is in contact with the second communication device, the application identifies the location of the first communication device based on the first communication device's geospatial placement, street address associated with the first communication device, or IP address, and can mimic the location of the first communication device's location in order to identify local emergency response resources or contact the NETNS to have at least one of police, fire, ambulance, or counseling dispatched to the location of the first communication device.

2. The system of claim 1 wherein the application further comprises at least one of the functions of client intake information, client emergency contact information, calendaring, note taking, client calling, video conferencing, recordation of communications, or day, date, and length of time of a session.

3. The system of claim 1 wherein the application allows a user of the second device to communicate with at least one of a local emergency resource or an operator of the emergency dispatch office in the area of the first communication device; and wherein said communication between at least one of the first communication device and the second communication device or the second communication device and the at least one of a local emergency resource or an operator of the emergency dispatch office in the area of the first communication device can be muted.

4. The system of claim 3 wherein the application further comprises at least one of the functions of client intake information, client emergency contact information, calendaring, note taking, client calling, video conferencing, recordation of communications, or day, date, and length of time of a session.

5. The system of claim 3 wherein the application allows at least one of a local emergency resource or the operator at the emergency dispatch office in the area of the first communication device to receive the communications between the user of the first communication device and the user of the second communication device; and wherein said communication between at least one of the first communication device and the second communication device or the second communication device and the at least one of a local emergency resource or an operator of the emergency dispatch office in the area of the first communication device can be muted.

6. The system of claim 5 wherein the application further comprises at least one of the functions of client intake information, client emergency contact information, calendaring, note taking, client calling, video conferencing, recordation of communications, or day, date, and length of time of a session.

7. The system of claim 5 wherein the application allows at least one of a local emergency resource or the operator at the emergency dispatch office in the area of the first communication device to communicate with the user of the first communication device as well as the user of the second communication device; and wherein said communication between at least one of the first communication device and the second communication device or the second communication device and the at least one of a local emergency resource or an operator of the emergency dispatch office in the area of the first communication device can be muted.

8. The system of claim 7 wherein the application further comprises at least one of the functions of client intake information, client emergency contact information, calendaring, note taking, client calling, video conferencing, recordation of communications, or day, date, and length of time of a session.

9. The system of claim 1 wherein the application allows the user of the application to input a designated address for the location of the first communication device and thus contact the emergency dispatch office for the location of the first communication device; and wherein said communication between at least one of the first communication device and the second communication device or the second communication device and the at least one of a local emergency resource or an operator of the emergency dispatch office in the area of the first communication device can be muted.

10. The system of claim 9 wherein the application further comprises at least one of the functions of client intake information, client emergency contact information, calendaring, note taking, client calling, video conferencing, recordation of communications, or day, date, and length of time of a session.

11. The system of claim 9 wherein the application allows a user of the second device to communicate with at least one of a local emergency resource or an operator of the emergency dispatch office in the area of the first communication device; and wherein said communication between at least one of the first communication device and the second communication device or the second communication device and the at least one of a local emergency resource or an operator of the emergency dispatch office in the area of the first communication device can be muted.

12. The system of claim 11 wherein the application further comprises at least one of the functions of client intake information, client emergency contact information, calendaring, note taking, client calling, video conferencing, recordation of communications, or day, date, and length of time of a session.

13. The system of claim 11 wherein the application allows at least one of a local emergency resource or the operator at the emergency dispatch office in the area of the first communication device to receive the communications between the user of the first communication device and the user of the second communication device; and wherein said communication between at least one of the first communication device and the second communication device or the second communication device and the at least one of a local emergency resource or an operator of the emergency dispatch office in the area of the first communication device can be muted.

14. The system of claim 13 wherein the application further comprises at least one of the functions of client intake information, client emergency contact information, calendaring, note taking, client calling, video conferencing, recordation of communications, or day, date, and length of time of a session.

15. The system of claim 13 wherein the application allows at least one of a local emergency resource or the operator at the emergency dispatch office in the area of the first communication device to communicate with the user of the first communication device as well as the user of the second communication device; and wherein said communication between at least one of the first communication device and the second communication device or the second communication device and the at least one of a local emergency resource or an operator of the emergency dispatch office in the area of the first communication device can be muted.

16. The system of claim 15 wherein the application further comprises at least one of the functions of client intake information, client emergency contact information, calendaring, note taking, client calling, video conferencing, recordation of communications, or day, date, and length of time of a session.

* * * * *